Figures 1, 2:
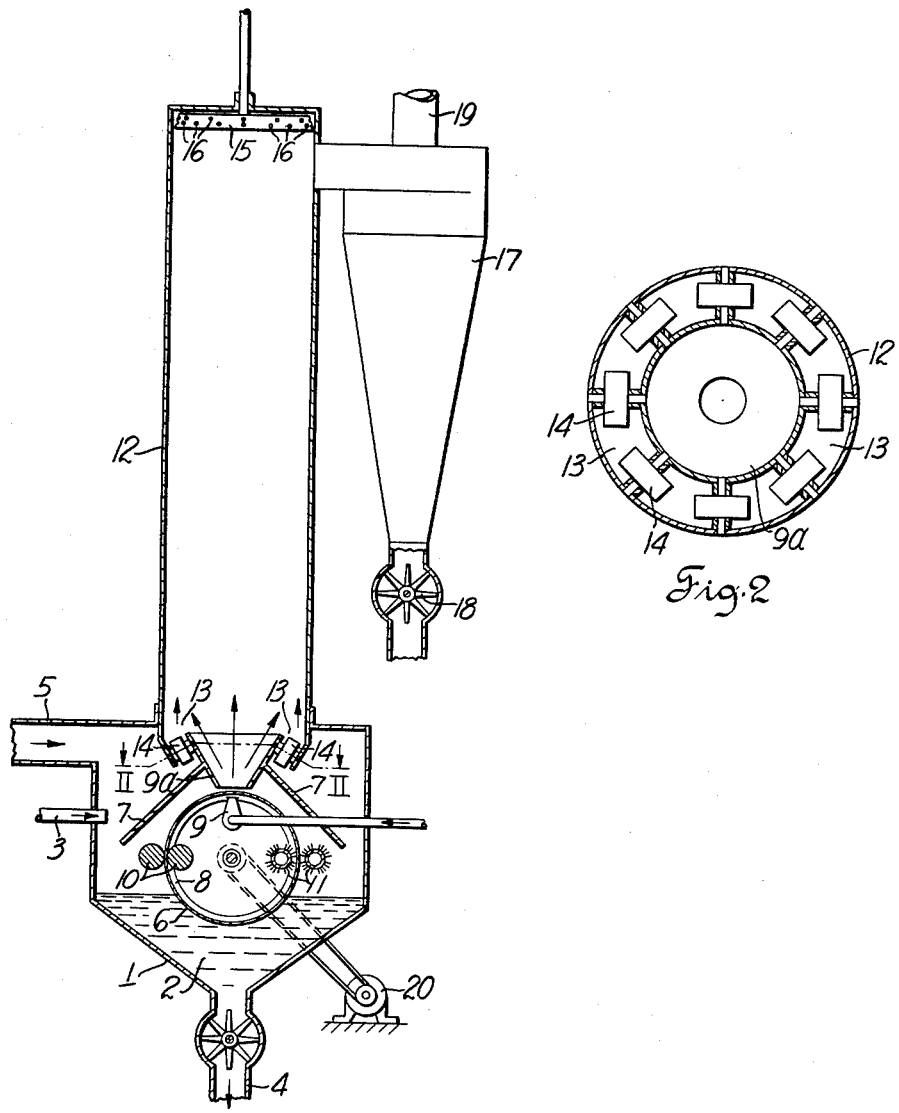

Feb. 9, 1965 O. HEINEMANN 3,168,989
PROCESS AND EQUIPMENT FOR THE PRODUCTION OF GRANULATED MATERIAL
Filed May 2, 1962

Inventor
Otto Heinemann
By Arthur M Streich
Attorney

United States Patent Office 3,168,989
Patented Feb. 9, 1965

---

3,168,989
PROCESS AND EQUIPMENT FOR THE PRODUCTION OF GRANULATED MATERIAL
Otto Heinemann, Neubeckum, Germany, assignor to Allis-Chalmers Manufacturing Company, Milwaukee, Wis.
Filed May 2, 1962, Ser. No. 191,911
12 Claims. (Cl. 241—3)

The present invention pertains to a process for the producton of very small granules of a predetermined homogeneous mixture of raw materials and an apparatus for the execution of the process. Such granulated material may be used for producing granular chemical compounds or for preparing ores in the production of cement.

There are many conventional procedures for granulating material by pulverizing material mixed with water as it passes through nozzles, followed by drying the material in a stream of hot gases. The material to be granulated is forced through nozzles while in suspension and sprayed out of the nozzles by means of an air current, and the delivery air stream is mixed with the material to be pulverized either inside or immediately outside the nozzle.

Such prior art approaches have the disadvantage in that the nozzles are subjected to considerable wear, especially when the material to be pulverized possesses abrasive characteristics, such as raw materials for cement. Moreover, there is the danger that tubing and nozzles become clogged, and furthermore, a crust may be formed when the installation is out of operation for some time and solid substances from the slime are deposited on the walls of the tubing and nozzles. In addition, the solid material is easily deposited out of the suspension as it passes through the tubing and during spraying through the nozzles in these conventional processes.

The present invention eliminates these disadvantages in a simple and safe manner.

In the process used by this invention, the material to be formed into granules of, for example, 0.5 mm. diameter, is first ground to a fine powder in any conventional manner. By first grinding to a fine powder, the homogeneity of the granulated material produced later is kept at an acceptable level. The pulverized material having the desired mixture of raw materials is then made into a thick mud. In this invention the mud in the form of a thin film is brought onto a carrier such as a screen of a rotating straining drum. The mud film is blown by means of air or another gas, from the screen into tiny portions that are carried into a hot air jet where the wet portions or agglomerates of the powder are dried to provide discrete granules. The final granules are then separated from the stream of gas in any conventional manner, for instance, by directing the stream through a cyclone separator.

An important feature of this present invention resides in the fact that the stream of hot gas, in addition to drying the granules, is also utilized for separating the oversize granules from the desired small size granules. The granules too heavy to be carried along by the stream of gas precipitates out during drying and falls back into the mud bath. The slowly thickening mud is collected in a sump and is constantly removed and mixed with more water in order that the desired consistency of the mud be maintained.

Apparaus for carrying on the process of this invention will be described with reference to the drawing, in which:

FIG. 1 is a schematic illustration partly in section of an installation according to the present invention; and
FIG. 2 is a section along line II—II of FIG. 1.

Referring to FIG. 1, there is shown a container 1 with a mud basin 2, mud inlet 3, mud outlet 4, and hot gas inlet 5. A straining drum 8 is provided with a cylindrical sieve 6 and is protected from falling oversize granules by a rooflike arrangement of plates 7. The lower portion of drum 8 and sieve 6 dips into a mud bath in mud basin 2. A nozzle 9 is inside the upper part of straining drum 8. The drum 8 is rotated about its central axis by such as, for example, motor 20. On the side of straining drum that runs upward there are scraper rollers 10 and on the side that runs downward there are cleaning brushes 11. A dryer 12 extends into container 1 and projects vertically upward therefrom. Dryer 12 is provided on its lower extremity with gas passage openings 13, in which there are adjustable swirl vanes 14. For cleaning inner walls of dryer 12 there may be provided a cleaning scraper 15 having an external configuration conforming to the internal configuration of dryer 12 and with cleaning spray nozzles 16 pointed outwardly at the inner walls of dryer 12. The entire assembly of scraper 15 and nozzles 16 may move up and down to scrape and wash down the inner walls of dryer 12. For separation of the finished granulated material from the gas stream emerging from the dryer 12 a cyclone separator 17 of conventional design is arranged and is provided with a star wheel gate 18 at its outlet.

In the process as it is performed by the apparatus just described, the material to be granulated is crushed to a power much finer than the final size granule desired. The raw material constituents are mixed with a liquid to form mud of the desired consistency. The mud is brought through mud intake 3 into mud basin 2 of container 1. Rotating screen drum 8 absorbs a film of mud with its sieve 6, and scraper rollers 10 insure uniform film thickness. The air jet, leaving nozzle 9, blows the film of mud from screen 6 and at the same time breaks up the film into agglomerates that are blown through a funnel shaped structure 9a into dryer 12. The hot gas for drying is first brought into contanier 1 through inlet opening 5 and the heating of the atmosphere around the upper part of drum 8 predries the mud film on sieve 6. The hot gas then flows through hot gas openings 13 into dryer 12. The swirl vanes 14 are adjusted to cause the hot gas stream moving upward in dryer 12 to spin, and attain a given speed free of rotation. The rate of this speed or a spin determines the sizes of granules that will be carried up and out dryer 12 and sizes that will fall back into basin 2. At the same time, the drying process can be influenced by changing the temperature of the hot gases brought in. The overlarge granulated material as it falls down through dryer 12 passes through hot gas passage openings 13 and rolls or tumbles down baffle plates 7, or through funnel 9a and straining drum 8, into mud trough 2. From time to time cleaning scraper 15 moves up and down in dryer 12 and sprays water from nozzles 16, thus keeping the walls clean. Cleaning scraper 15 may be perforate so that gases may pass through without obstruction during the cleaning operation. The hot gas jet carries the finished granulated material into cyclone 17, where it is separated from the carrier gas. The granules are taken out through bucket elevator gate 18 and the carrier gas exits from a conduit 19.

Having now particularly described and ascertained the nature of my said invention and the manner in which it is to be performed, I declaire that what I claim is:

1. A process for producing desired size granules of a material, in which: the material is first ground to particles smaller than said desired size; then mixed with liquid to form mud; then deposited as a thin film upon a carrier; a gas is then blown into engagement with said film to break said film into portions and below said portions from said carrier; a heated gas is blown to engage the first gas and portions of material to dry the material into discrete granules; and the granules are separated from said gases.

2. The process of claim 1 in which granules too large and heavy to be carried by the blown gases, are dropped from the gases, caught and returned to be mixed with the mud.

3. The process of claim 2 in which the mud thickened by falling granules caught therein is mixed with more liquid to maintain the mud at a desired flowable consistency.

4. An apparatus for producing desired size granules from a mud of liquid and particles smaller than the desired size, comprising: a sieve, means for depositing mud in a thin film on said sieve, a gas discharging nozzle on one side of said sieve aimed to discharge gas normal to and at said sieve, a drying chamber on the side of said sieve opposite said nozzle, means for blowing heated gas into said drying chamber for drying portions of the film blown from said sieve and into said chamber by the operation of said nozzle.

5. An apparatus for producing desired size granules from a mud of liquid and particles smaller than said desired size, comprising: a container, a mud basin in the bottom of said container, a drying chamber projecting upwardly from said container, a drum sieve mounted with its central axis in a horizontal plane and arranged within said container below said chamber and with a portion of the cylindrical surface of said sieve dipped into said mud basin, means for rotating said sieve about said central axis whereby said sieve picks up a film of mud which rotation of said sieve carries upwardly in said container to a position beneath said drying chamber, a gas discharging nozzle mounted within said drum sieve and aimed upwardly into said drying chamber for blowing portions of said film off said sieve and upwardly into said drying chambers, and means for admitting heated gas into said drying chamber for drying said portions into discrete granules.

6. In the apparatus of claim 5, said heated gas admission means being provided with adjustable swirl vanes for directing the heated gas into and up the drying chamber with a swirling action.

7. In the apparatus of claim 5, baffle means in said container below said drying chamber and over said drum to guide oversize granules dropping from said drying chamber along the walls thereof and direct such granules into said basin.

8. In the apparatus of claim 5, a pair of scraper rollers arranged with one engaging the outer surface of said sieve and the other engaging the inner surface of said sieve, said rollers being arranged above said basin on the side of said drum moving upwardly upon rotation of said drum.

9. In the apparatus of claim 5, a pair of brushes arranged with one engaging the outer surface of said sieve and the other engaging the inner surface of said sieve, said brushes being arranged above said basin on the side of said drum moving downwardly upon rotation of said drum.

10. In the apparatus of claim 5, a cleaning scraper with nozzles for dispensing cleansing agents, said scraper having an outer configuration conforming to the inner cofiguration of said drying chamber and being located in said drying chamber in vertically movable relation thereto.

11. A process for producing desired size granules of a material, in which: a mud of liquid and particles smaller than said desired size is deposited as a thin film upon a carrier; a first gas is then blown into engagement with said film to break said film into portions and blow said portions from said carrier; a heated gas is blown to engage the first gas and portions of material to dry the material into discrete granules; and the granules are separated from said gases.

12. An apparatus for producing desired size granules comprising: a carrier, a means for depositing a mud of liquid and particles smaller than the desired size in a thin film on said carrier, first means for blowing a first gas into engagement with said film to break said film into portions and blow said portions from said carrier, second blowing means for blowing heated gas into engagement with said first gas and portions of said material to dry said material into discrete granules, and means for separating said granules from said gases.

References Cited in the file of this patent
UNITED STATES PATENTS

| | | |
|---|---|---|
| 2,062,505 | Corkill | Dec. 1, 1936 |
| 2,210,999 | Bartholomew | Aug. 13, 1940 |
| 2,393,783 | Kridel | Jan. 29, 1946 |
| 2,568,400 | Kearby | Sept. 18, 1951 |
| 2,773,650 | Doyle | Dec. 11, 1956 |
| 2,774,660 | Cook et al. | Dec. 18, 1956 |
| 3,058,673 | Firing | Oct. 16, 1962 |